United States Patent [19]

Scorse et al.

[11] Patent Number: 5,426,513
[45] Date of Patent: Jun. 20, 1995

[54] PRIORITIZED IMAGE TRANSMISSION SYSTEM AND METHOD

[75] Inventors: Jim Scorse, Webster; Daniel A. Throop, Victor; Adam Beck, Henrietta; Mark Jaworski, Fairport, all of N.Y.

[73] Assignee: Harris Corporation, Melbourne, Fla.

[21] Appl. No.: 531,637

[22] Filed: Jun. 1, 1990

Related U.S. Application Data

[63] Continuation-in-part of Ser. No. 367,365, Jun. 16, 1989, Pat. No. 5,128,776.

[51] Int. Cl.[6] ............................................. H04N 1/41
[52] U.S. Cl. .................................... 358/433; 358/426; 358/432; 358/453; 382/9
[58] Field of Search ............... 358/426, 432, 433, 429, 358/261.1, 261.3, 453, 105, 133, 135, 136, 138, 400, 401, 405, 434, 437, 439; 382/54, 56; 340/94.1

[56] References Cited

U.S. PATENT DOCUMENTS

| | | | |
|---|---|---|---|
| 3,743,765 | 7/1973 | Maier | 358/426 |
| 4,654,654 | 3/1987 | Butler et al. | 370/94.1 |
| 4,694,352 | 9/1987 | Ina et al. | 358/426 |
| 4,803,685 | 2/1989 | Oget | 371/33 |
| 4,907,095 | 3/1990 | Komura et al. | 358/453 |
| 4,962,521 | 10/1990 | Komatsu et al. | 358/453 |

Primary Examiner—Edward L. Coles, Sr.
Assistant Examiner—Thomas D. Lee
Attorney, Agent, or Firm—Rogers & Killeen

[57] ABSTRACT

A system and method for processing and transmitting video imagery. The system permits the operator of a video image system to selectively transmit desired portions of the video image at an operator selected resolution, operator selected compression level, and operator selected order of transmission of each of the portions. The system also includes a novel method of retransmitting only those packets of data which have been erroneously transmitted and an automated retransmission protocol which retransmits data in a more robust manner where errors are detected in the first transmission of the data. Also disclosed in the system is a method of shading various portions of the video image to inform the system operator of which portions of the video image have been transmitted and a protocol for limiting the duration of and for altering the frequency of data transmissions to avoid detection and/or jamming by others.

22 Claims, 9 Drawing Sheets

+ = INTEREST CENTER

| SHADING | MEANING |
|---|---|
| G | NOT TRANSMITTED |
| W | FULL RESOLUTION |
| B | PARTIAL COMPRESSION |
| R | FULL COMPRESSION |

PRIORITIZED IMAGE TRANSMISSION SYSTEM AND METHOD

This is a continuation of application Ser. No. 367,365, filed Jun. 16, 1989 now U.S. Pat. No. 5,128,776.

BACKGROUND OF THE INVENTION

The present invention relates generally to digital data processing and transmission techniques, and particularly to systems and methods for transmitting digital video images within limited bandwidths.

Presently, there are many systems in which video images are transmitted by means of electrical or electromagnetic signals. Examples of such transmitted video images are television, electronic photographs, facsimiles, video mapping, etc. Particularly when color video images are to be transmitted, the transmission system generally requires considerable bandwidth for the signal. While large bandwidth systems, such as a typical television transmission system, can often adequately transmit a video signal, a considerable amount of bandwidth is required, and the transmitting and receiving equipment must be relatively complex and expensive to process large bandwidth signals. Additionally, in military applications, large bandwidth transmissions are more readily detected and, therefore, more susceptible to jamming than more narrow band signals.

In many video image systems, a video image to be transmitted is divided into an array of picture elements or pixels. Each pixel represents the video image at one small point of the pixel array. In some systems, a pixel may be represented by a single digital bit, either a zero or a one, indicating either the presence or absence of white in the portion of the image represented by the pixel. In more sophisticated systems, each pixel is represented by plural digital bits which permit each pixel to have more than binary values of zero and one. For example, if four bits are used to represent a pixel then the pixel may have up to sixteen different values, generally ranging from white to black. Each increment from one to sixteen in the binary digits often represents a darker or lighter shade of gray transitioning from white to black. Finally, in color systems, each pixel may be represented by three sets of plural digital bits, each of the plural digital bits of a set representing the amount of one of the primary colors (red, blue or green) present at the portion of the visual image represented by the pixel. Such a scheme is often utilized in digitizing television images.

A standard broadcast color television picture may be adequately digitized into an image 768 pixels wide and 488 pixels high with each pixel having a depth of 24 bits (8 bits each of red, blue and green). Each screen image then contains approximately 375,000 pixels or approximately 9 million bits of digital data. While such large amounts of data can readily be sent by large bandwidth transmission and receiving equipment, it is often desired to send such digital video images by less expensive and more readily available low speed equipment such as HF (high frequency) radio and telephone voice lines. Such low speed devices typically operate at anywhere from 1200 to 9600 bits per second. If a single digital television image is sent via such a low speed transmission link, for example, a 2400 bps link, approximately 65 minutes would be needed to send a single image. In a tactical military situation, a transmission of such duration is usually desired to be avoided as such a long duration transmission could readily be detected and jammed. Moreover, such a long transmission time for each image would permit only a single image to be sent per hour.

Many of the known video image transmission systems transmit an entire screen of data. Often, however, only certain portions of the screen are of interest to the recipient of a signal and some portions of the image may be of more importance than others. In most known video signal transmission systems, no provision is made for transmission of only a selective portion of the video image or for transmission of different portions of the image at different resolutions.

While visual images in the form of television signals may be transmitted quite accurately by VHF equipment, VHF transmissions are generally limited to the line of sight between the transmitter and the receiver. Consequently, it is often desired to send television and other video image signals at other than VHF frequencies. For example, the use of signal carriers in the high frequency ("HF") range, i.e., 3,000 to 30,000 KHz, often permits worldwide communication between transmitter and receiver as the HF signal can be bounced or reflected off the ionosphere and back to earth. Conventional HF systems do not have sufficient bandwidth to send real time television signals, however.

It is accordingly an object of the present invention to provide a novel video image system and method whereby digital video images may be transmitted worldwide and/or through relatively low bandwidth transmission media.

It is a further object of the present invention to provide a novel system and method for video image transmission whereby selected portions of a video image may be transmitted to a receiver.

It is yet another object of the present invention to provide a novel video image system and method in which the resolution of the image to be transmitted may be controlled by the operator of the video system in accordance with the operator's interest in the contents of the video image.

It is still a further object of the present invention to provide a novel system and method of video image transmission whereby the portion of the image of most interest to the user is transmitted first.

It is still another object of the present invention to provide a novel video image system and method in which the operator of a video transmission system is made aware of the progress of the transmission of video image data.

It is still yet another object of the present invention to provide a novel video image system and method in which the time during which transmission takes place is limited to relatively small bursts and in which successive transmissions may be made at different transmission frequencies.

These and many other objects and advantages of the present invention will be apparent from the claims and from the detailed description of the preferred embodiments when read in conjunction with the appended drawings.

DETAILED DESCRIPTION OF THE PREFERRED EMBODIMENTS

Figure 1:
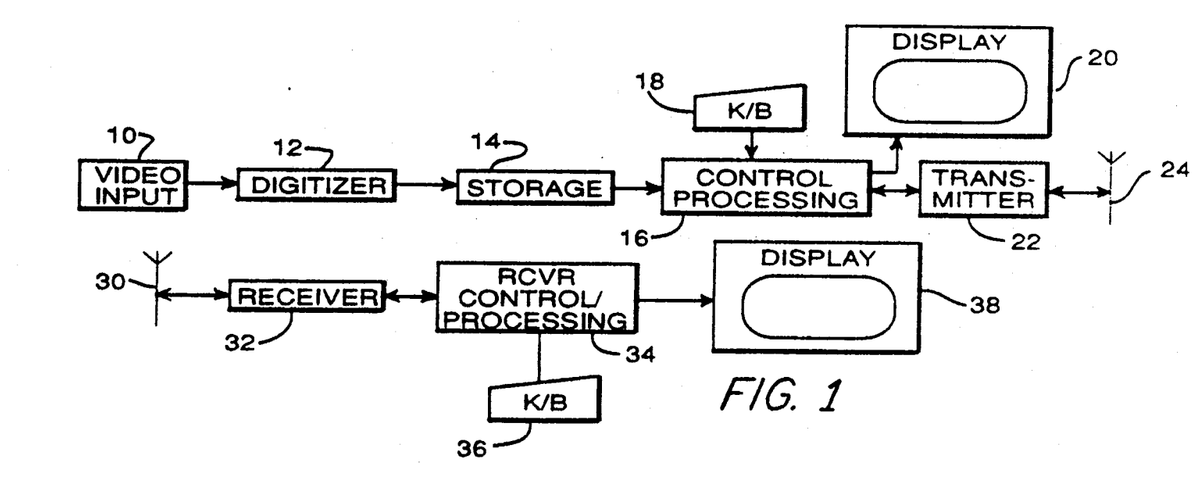
FIG. 1 is a functional block diagram of a video processing and transmission system which may use the system and method of the present invention.

With reference to FIG. 1, a video input device 10 may receive or generate a video signal in a conventional analog signal format in correspondence to a sensed visual image. The signal may be color encoded.

The analog signal from the video input device 10 may be digitized by a digitizer 12 which periodically produces a digital signal related to the gray level and/or the color of the video input signal. The digital signals produced by the digitizer 12 may be stored in a storage device 14 in an array which has reference to the position of each of the digital signals within the image being provided by the video input device 10. Accordingly, each of the digital signals may be considered a picture element, or pixel, relating the video image seen by the video input device 10 to a particular position within the entire video image and the digital storage array may be considered a digital map of the visual image. In a standard television signal, for example, the video input signal is often stored in an array which has 768 pixels horizontally and 512 pixels vertically. However, the exact number of pixels into which a visual image is divided is not significant to the present invention.

The pixels may be related to the gray level of the visual image, how white or how black the image is, and/or it may be related to the color of the image, i.e., how much of the colors red, green, and blue are detected by the detectors within the video input device 10.

Once the pixels are stored in the storage device 14, they may be acted upon by the control/processing unit 16 which is controlled by a keyboard 18. The video signal represented by the stored pixels, available to the control/processing unit 16, may be displayed in a monitor 20. Upon command by the operator of the control/processing unit 16, a signal which contains all or a portion of the visual image stored in the storage device 14 may be sent to a transmitter 22 to be transmitted to a remote device via a transmitter antenna 24. When the transmitted signal is received at a receiver antenna 30, it may be sent to a receiver 32 which removes any carrier signal or the like which may have been used during the transmission and provides the visual image signal to the receiver control/processing unit 34 which is, in turn, controlled by a keyboard 36, on which commands may be entered by the operator of the receiver portion of the system. Upon the command of the operator, the receiver control/processing unit 34 may provide the visual signal to the display unit 38.

The video input device 10 may be any conventional video input unit such as a black-and-white television camera, a color television camera, a facsimile machine, an optical scanner, or similar device which converts visual or optical imagery into an electrical or electromagnetic signal. The storage device 14 and control/processing unit 16 and 34 may be conventional computer or personal computer storage and control systems. The display monitors 20 and 38 may be conventional television monitors (black-and-white, monochrome, or color) or similar devices on which a visual image may be obtained from electronic signals.

The control/processing unit 16 provides the visual image data to the transmitter 22 which may transmit the data in a conventional format or in the novel format described hereinbelow. The receiver control/processing unit 34 and associated keyboard 36 may also be a conventional computer or personal computer and may include a volatile memory to temporarily hold visual image data and/or permanent storage device such as magnetic disks to save, for a longer term, selected desired visual images.

Figure 2:
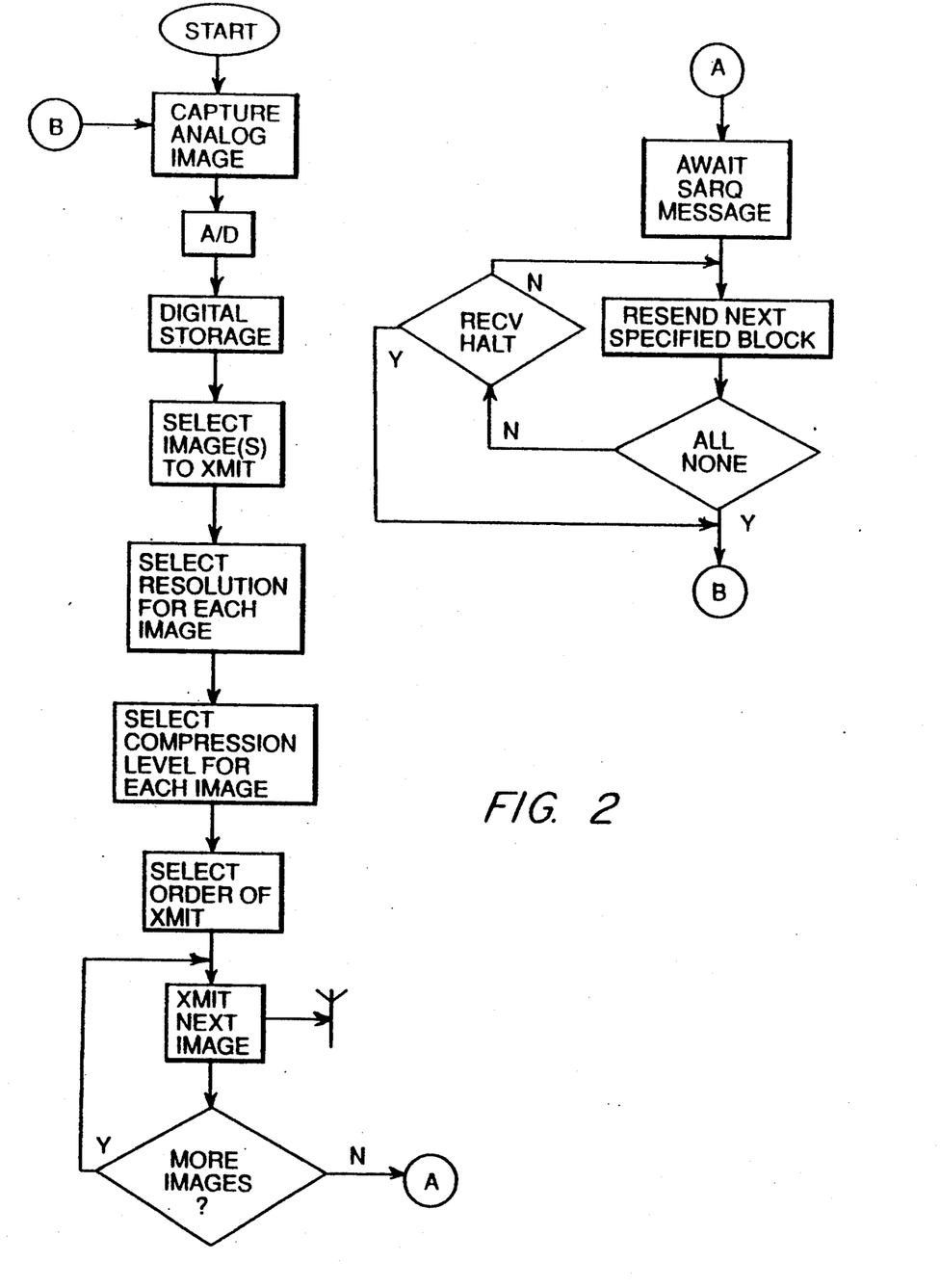
FIG. 2 is a flow diagram of one embodiment of the system and method of the present invention which may be utilized in the video image processing system of FIG. 1.

With reference to FIG. 1 and additional reference to FIG. 2, the visual image transmission and processing system and method of the present invention may utilize the steps depicted in the flow diagram of FIG. 2. At the start of the sequence, a visual image frame is captured by the video input device 10 and digitized through, for example, an analog-to-digital signal converter and placed into digital storage. The frame of visual data which has been stored may be a high resolution still-frame color image with the storage representing individual pixels of the image.

With continued reference to FIGS. 1 and 2, by controlling the keyboard 18, the user may specify one or more portions of the visual video image to transmit, or select to transmit the entire image. The video image may be divided into conveniently sized blocks of data for ease of selection and manipulation. The operator of the system may select the resolution, compression level, and order of transmission (in the event more than one portion is desired to be sent) for each portion (i.e., a group of blocks) of the image which he desires to transmit. After the operator selects the one or more portions to be transmitted the control/processing unit 16 obtains the digital data from the storage unit 14 which correspond to the selected portions of the image. The digital data corresponding to the portions may then be processed by the control/processing 16 unit to reduce the resolution and to compress the image if such has been selected by the operator. The digital data corresponding to the selected portions may then be loaded into communication packets which may be provided, in the order selected by the operator, to the transmitter for transmission to the receiver portion of the system. When the transmission of the digital data corresponding to the selected portions of the image is complete, the transmitting portion of the system awaits an acknowledgment message (an "ACK/NAK" message) from the receiving portion of the system. The ACK/NAK message informs the transmitter portion of the system whether each block of data was correctly or incorrectly received by the receiver 32. In the event a block was incorrectly received, the message includes a request that the transmitter resend only the incorrectly received packets in the specified blocks of data. The transmitter may then resend the selected packets until all of the selected packets have been resent or until the receiver sends an abort message halting the retransmission of the data.

Figure 3A:
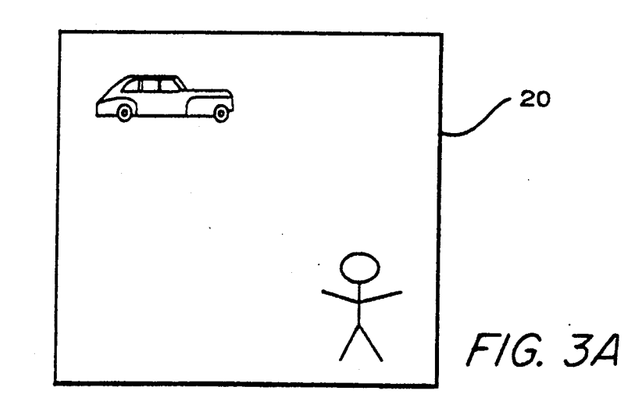
FIG. 3A–3D are diagrammatic illustrations of the operation of the system of FIG. 2.

A method by which the operator of the transmitter portion of the system may select which portions of the visual image to transmit is illustrated in FIGS. 3A–3D. With reference to FIG. 3A, a visual image may have portions which are of more interest to the operator of the system than other portions of the image. At the command of the operator, the control/processing unit 16 may display on the monitor 20 the visual image as depicted in FIG. 3A. Upon a further command of the operator, the control/processing unit 16 may provide a grid overlay on the visual image of FIG. 3A to produce the overlay image shown in FIG. 3B. Through use of conventional input devices such as a keyboard 18, or mouse, etc., the operator of the system may then specify a specific block or specific location within the grid which is of particular interest to the operator for transmission. The block or location is herein called the "interest center" and will normally be transmitted first by the control/processing unit 16.

Figure 3B:
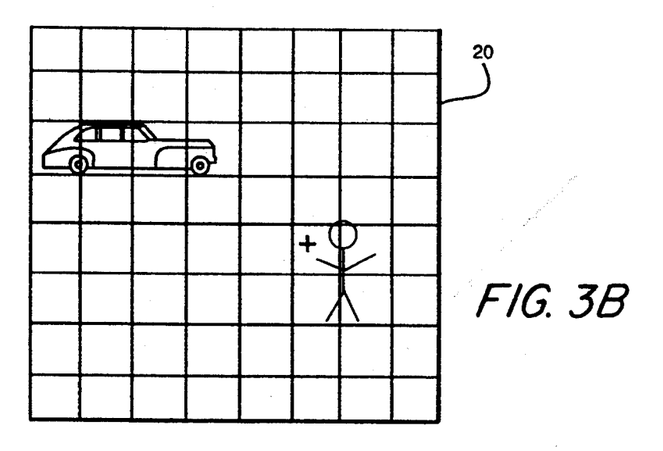
Figure 3C:
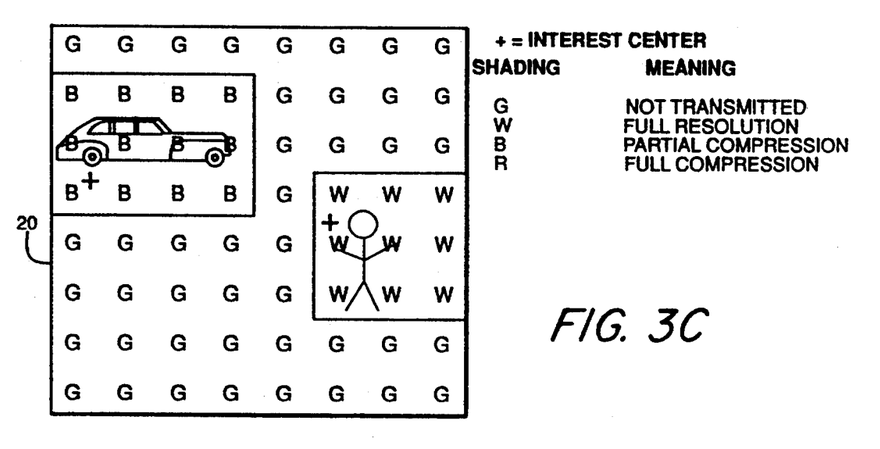

With continued reference to FIG. 3B, the plus sign ("+") indicates the block which the operator has selected as his interest center in this example. Once the interest center has been selected, the operator may then specify the entire portion of the image which is to be sent in association with the specified interest center, i.e., the operator may specify the "borders" of the portion to be transmitted. As shown in FIG. 3C, the operator may, for example, select a square portion of the image which best illustrates the "man" and nearby background depicted in the visual image. To assist the operator in selecting the portion of the screen, the control/processing unit 16 may construct overlays on the screen which define for the operator what portions of the screen he has selected. Such definition could be provided by shading the visual image with particular colors or particular hues to indicate the selected portion. With reference to the visual image of the man shown in FIG. 3C, the code W indicates the portion of the visual image which has been selected by the operator for transmission.

With continued reference to FIGS. 3B and 3C, the operator may continue to select other portions of the visual image such as the selection of the "vehicle" illustrated in FIGS. 3B and 3C. The code "B" in FIG. 3C indicates the portion of the visual image which has been selected by the operator to send the interest center related to the vehicle.

As a part of selecting the interest center and portions of the visual image to be transmitted, the system of the present invention permits the operator to specify both the resolution and compression to be used in transmitting each of the portions of the visual image. To remind the operator what portions of the visual image have been selected and what resolution and compression levels have been selected, the system of the present invention may key the shading which is used on the monitor to specify the portion to be transmitted in a scheme known to the operator.

Figure 3D:
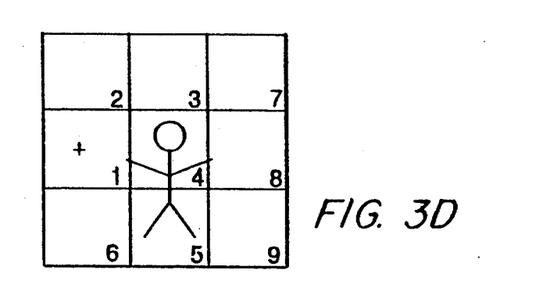

With reference to FIG. 3D, the selected portion of the visual image around the "man" of FIG. 3A is illustrated in greater detail. Each of the blocks of the visual image has been numbered for purposes of explanation from one to nine. In the system of the present invention, the data may be sent in blocks of a predetermined size, for example, 64 pixels by 64 pixels. The block which the operator has specified is the interest center (labeled "1" in FIG. 3D) may be sent first and then the blocks adjacent to the interest center may be sent. The process may be continued radially outwardly, such as in a spiral fashion, until all blocks of the selected portion of the picture have been transmitted. In the example shown in FIG. 3D, the blocks may be sent in the order of their illustrative numbering, 1, 2, 3, . . . 9. By the use of this procedure, the portion of the visual image which the operator has determined to be the most significant is sent first. As each block is transmitted it may be shaded to indicate that it has been transmitted. When the receiver is receiving the visual image, the operator of the receiver may determine that partially through the transmission he has received sufficient data and command the system to go to the next interest center. In this way, transmission time is kept to a minimum and the information of most importance is transmitted with priority. Similarly, the operator of the transmitter may command the system to go to the next interest center partially through a transmission.

When the operator of the system of the present invention selects more than one portion of an image (which may be unrelated and on nonconnecting portions of the screen), the operator also selects which image portion will be transmitted first, second third, etc. Once this selection process is made, the control/processing unit may transmit each selected image portion from the interest center of the image out to the selected border of each image portion. This process continues until all selected image portions are completely transmitted or until the transmission is otherwise ended.

In the system of the present invention, the operator can specify which of a large number of resolution techniques and levels should be utilized depending upon the transmission protocol, the noise levels on the transmission channels, and the images being transmitted.

In addition to techniques which reduce the resolution of the data and correspondingly reduce the amount of data which need to be transmitted, the system of the present invention also enables the operator to select varying levels of compression of the data, such as normal Hoffman encoded, or various ratios of subsampled data. The data may be compressed in any conventional data compression technique.

Reference is made to U.S. patent application Ser. No. 367,365, filed Jun. 16, 1989, the parent of the present application, for non-limiting examples of compression and resolution techniques.

In operation, the present invention may use two message types: data packets for transmitting image data, and ACK/NAK messages sent from the receiver of the image data to the transmitter indicating which data packets were incorrectly transmitted.

Figure 4:
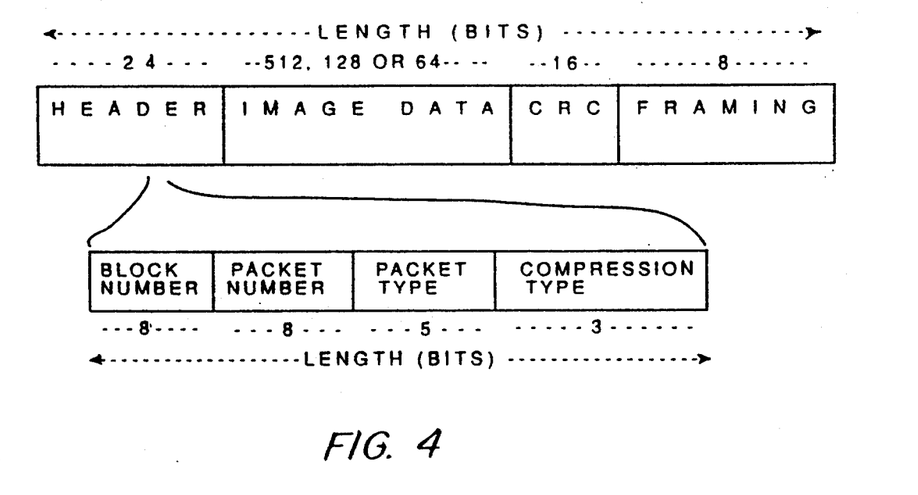
FIG. 4 is a diagrammatic illustration of the format of a data packet which may be utilized in the system of FIG. 2.

With reference now to FIG. 4, a data packet may include a header with administrative information, the image data, a check sum, and framing characters. The length of each segments may be any appropriate number of bits, with number of bits per segment shown in FIG. 4 being exemplary.

The header may take various forms and may include a block identifier, a packet identifier, an indicator of packet type and an indicator of the type of compression and/or resolution used. The block identifier may identify the block by pixels or may include control information, such as a signal indicating that text is to be sent, transmitting station identifier, total number of data blocks to be sent, etc. The packet identifier may be a vector pinpointing the location of the image data within the identified block. In addition to indicating that the data packet is a standard type, the packet type indicator may be used to signal such events as the first or last packets in a block, a packet of unusual size, a transmission abort, etc. The indicator of compression type may include codes identifying the level and type of compression in the transmitted data.

Image data may be loaded sequentially into data pockets and then transmitted block-by-block. The amount of image data per packet may be variable with a predetermined maximum, such as 512 bits. For example, where 8 bits are required to describe a pixel, 64 pixels might be described in one data packet; in a data block 64 pixels on a side, 64 such data packets would be used to describe a complete data block; a screen 512 pixels on a side would be divided into 64 such data blocks, with 4,096 data packets describing the screen (of course, careful selection of blocks for transmission and data compression would reduce the number of data packets needed to adequately describe a portion of the screen). In the event that the last pieces of image data for a particular data block are loaded before a data packet is completely filled (e.g., only 256 of 512 bits filled), data from the subsequent block may be added to the data packet following an abbreviated header.

The check sum segment of the data packet allows the receiver to detect errors in the transmitted data packet. Any known data integrity assurance technique may be used, although the cyclic redundancy check sum (CRC) is preferred. The framing characters may be used to locate a packet.

Figure 5:
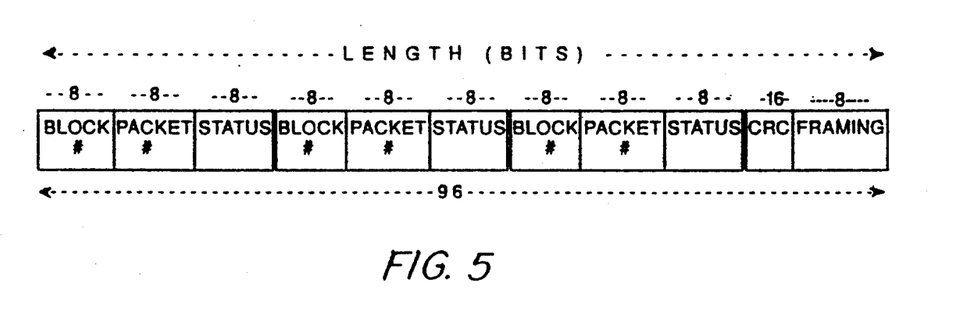
FIG. 5 is a diagrammatic illustration of the format of an ACK/NAK message which may be utilized in the system of FIG. 2.

With reference now to FIG. 5, the ACK/NAK message is a packet status report. If all packets from a block were correctly transmitted the ACK/NAK message may include only a brief indication of that event. If, on the other hand, one or more packets within a block were incorrectly transmitted (e.g., the check sum didn't match, the packet was missing or did not have a check sum), the ACK/NAK message may include the identifier of each packet incorrectly transmitted. The ACK/NAK message may also include a check sum and framing characters.

In the event the transmitter receives the ACK/NAK message that indicates one or more data packets were incorrectly transmitted, the data from the specified packets may be retransmitted in smaller packets. For example, four packets containing 128 bits of image data each may be transmitted to correct one 512-bit packet.

To increase the liklihood that a data packet is transmitted correctly, the packet may be repeated, with the number of repetitions being based on an operator-selected transmission condition. For example, in optimal transmission conditions, a data packet being retransmitted in response to an ACK/NAK message might be retransmitted twice, while in degraded transmission conditions it might be retransmitted four times. In the system of the present invention, the operator of the receiver may override this automatic retransmission if the operator is satisfied with the quality of the received image.

This error elimination process can continue until the image is totally correct, until it is manually aborted, or until a predetermined number of cycles has been achieved. Because the receiving operator may cancel the retransmission of bad blocks, the system helps to avoid detection in a military environment by reducing the amount of time during which the messages must be transmitted.

As the images or portions of images are being sent from the transmitting terminal to the receiving terminal, the data blocks which are and have been sent may be shaded, highlighted, or boxed on the transmitting unit's monitor for the information of the operator. This technique provides a visual que to the unit operator to decide when the abort or stop a transmission of an image.

Figure 6:
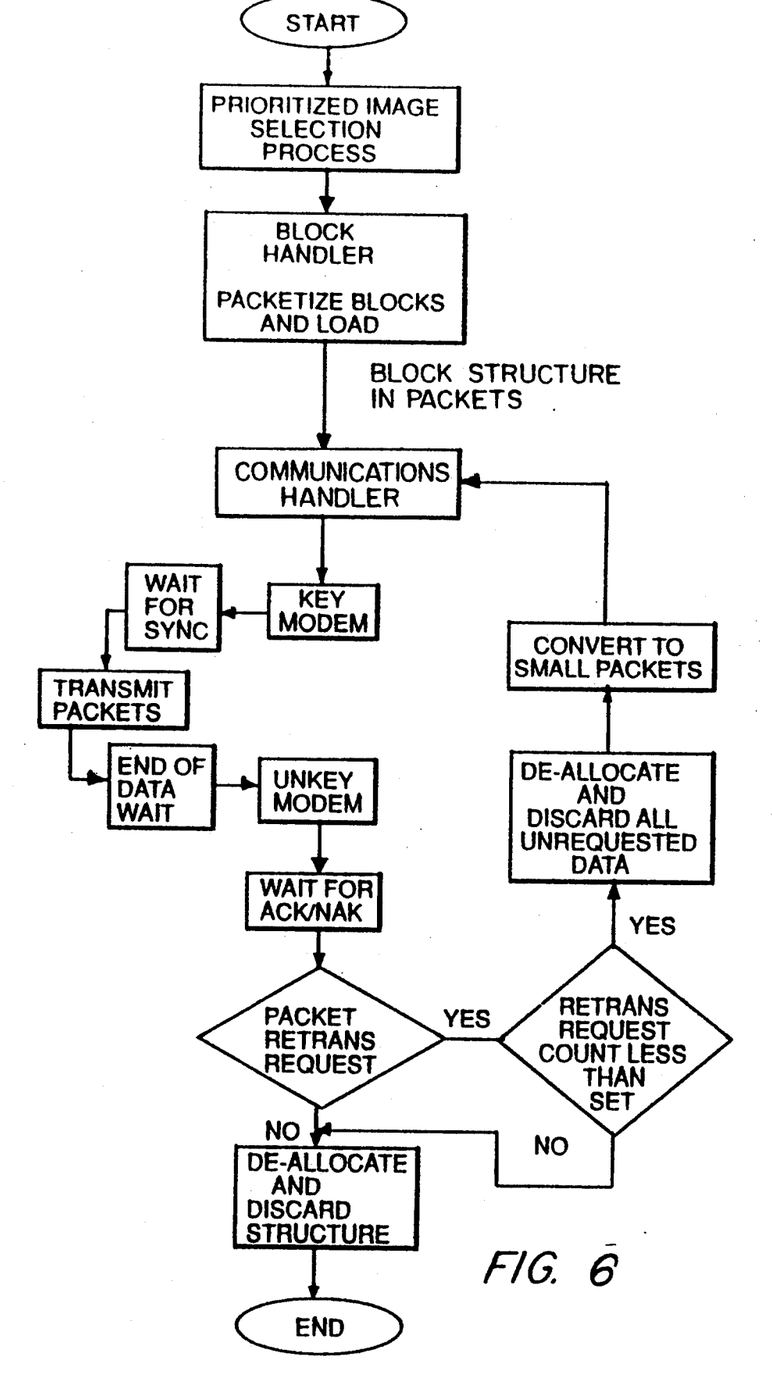
FIG. 6 is a functional block diagram of an embodiment of a transmitting unit of the present invention.
Figure 7:
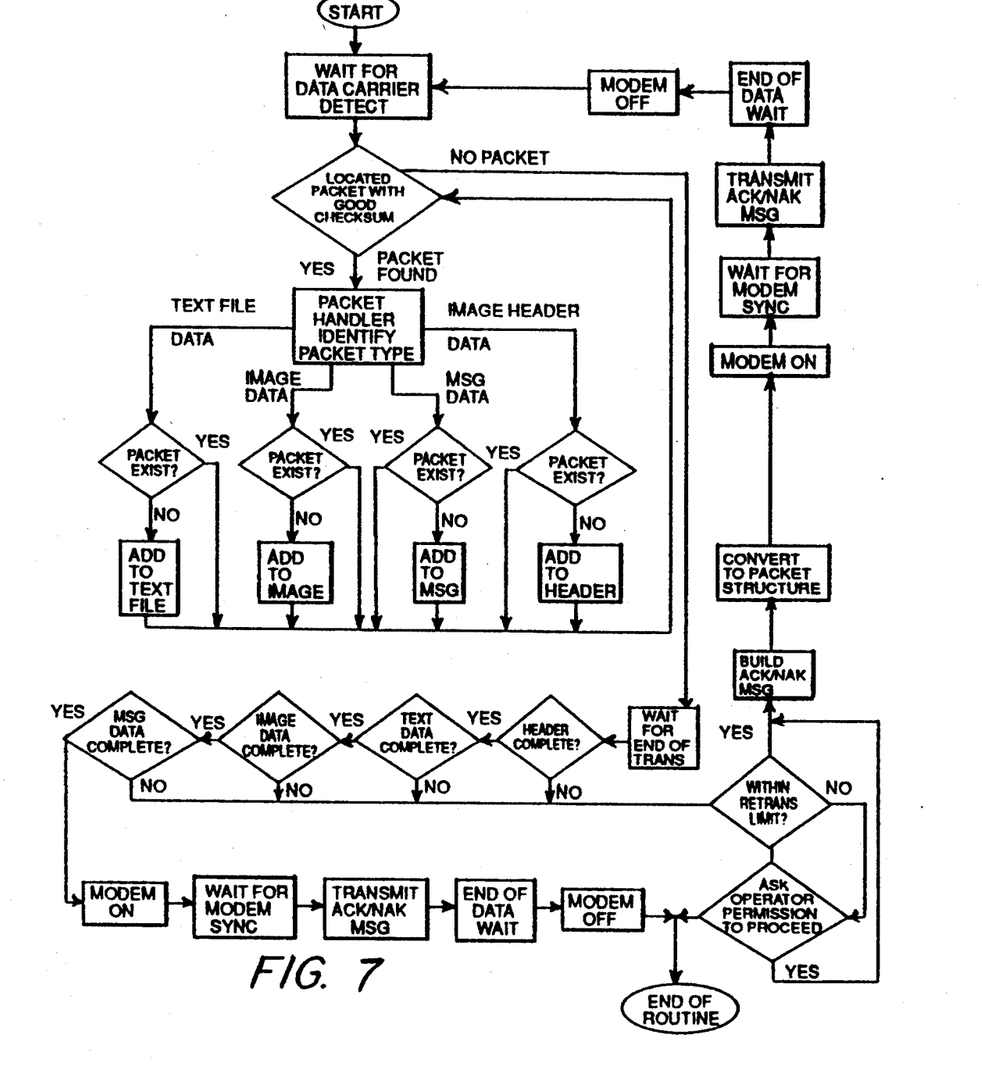
FIG. 7 is a functional block diagram of an embodiment of a receiver unit of the present invention.

The operation of an embodiment of the present invention may be described with reference to FIGS. 6 (transmittor unit) and 7 (receiving unit). The operation of the transmitting unit may begin with the operator's selection of the data blocks to be transmitted. The image data from the selected blocks may be loaded into packets in a block handling unit. A communications unit operates a modem and transmits the data packets. In the event an ACK/NAK message is received requesting retransmission of selected packets, the operator may stop the retransmission after a predetermined number of retransmission requests (a parameter set by the operator) to avoid prolonged periods of transmission. Data from incorrectly transmitted packets may be reloaded into smaller packets and retransmitted. When the transmission of image data is complete and all errors resolved, the image data may be discarded.

The operation of the receiving unit illustrated in FIG. 7 may begin with detection of a transmitted signal and identification of a packet with a good check sum. A packet handler may identify the type of packet (e.g., image data, text for screen, other message, header control information) and allocate the information appropriately. When the transmission is completely received, the ACK/NAK message may be built and transmitted. The operator of the receiver unit may set a limit on the number of allowed retransmissions to reduce the length of the transmissions.

Figure 8:
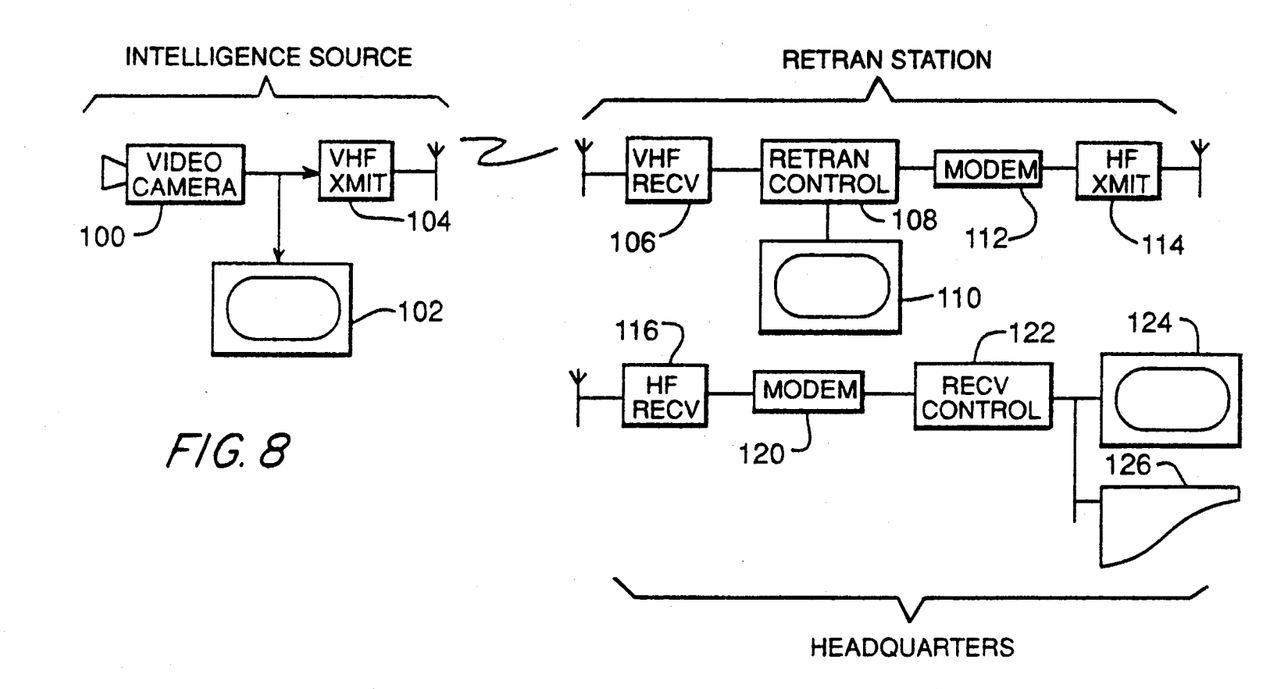
FIG. 8 is a functional block diagram of an intelligence gathering system which utilizes the system of the present invention.

With reference to FIG. 8, the video image processing and transmission system may be embodied in an intelligence system in which an intelligence source operates a video imagery device such as a video camera 100. The operation of the video camera is monitored by a display device 102 accessible to the operator of the intelligence source. The signal obtained from the video camera may be transmitted through a conventional VHF transmission system to a line of sight receiver. Such a system is readily adaptable to military aircraft to which a high resolution television camera is attached and utilized for reconnaissance purposes.

Because the intelligence source may not be within line of sight distance of the desired recipient of the visual information, the VHF transmission may be received by a retransmission station located within the line of sight of the intelligence source. Upon receipt of the transmission the VHF by receiver 106, the signal is applied to the retransmission control station 108 which contains the digitizer, storage unit, and control/processing unit of the present invention. When the retransmission control operator has determined which portions of the received signal to retransmit to the headquarters, the selected digital video signals are sent, as described above, through a modem to a high frequency transmission unit 114. Because the signal being sent by the retransmission station is sent with a high frequency, the signal may be sent far beyond the line of sight distance. When received by HF receiver 116 at the headquarters' unit, the signal may be demodulated by the modem 120 and displayed on a monitor 124, or hard copy production device 126 under control of the receiving control/processing unit 122. In a specific embodiment, many remote intelligent sources can be each transmitting to plural retransmission stations which in turn are each retransmitting the selected video signals to the headquarters location. In this way, a field commander can obtain visual imagery of various aspects of a military deployment in numerous remote locations in near real time.

The system of the present invention may be used in a wide variety of visual communication systems, particularly (although not necessarily) when some portions of the communication system are not within the line-of-sight of other portions. One of the advantages of a system of the present invention is the ability to use relatively narrow-bandwidth communication devices (such as telephone lines, HF radio links, optical cable, etc.) in the transmission of visual imagery without the consumption of inordinate periods of time. The adaptability of the selective image portion transmission method generally reduces the amount of time needed to transmit visual images of interest and reduces the need to transmit detailed imagery of little concern to the user in order to obtain detailed imagery of great concern to the user.

The system of the present invention may readily be utilized within the large, existing network of low speed communications, such as the vast telephone systems and within the bandwidth limits of existing communications equipment such as modems and HF radio links.

Whenever it is desired to avoid eavesdropping, or in military environments to avoid detection and/or jamming, it is often desired to limit the amount of time during which a system is actively broadcasting. In a system of the present invention, detection and jamming may be avoided by breaking the message blocks into smaller units or packets, and transmitting each packet at a differing frequency after a random delay time between the transmission of successive packets. In a system of the present invention, the transmitting unit may initiate the transmission of a visual image by transmitting a portion of the image as well as set of control data to the receiving terminal. The control data includes the time of the next transmission, the length of the next transmission (or image) and the transmitting frequency of the next transmission. At the conclusion of the transmission of the message, the control data may include a reply frequency and time. By examining the control data, the receiver can be automatically set to transfer to the assigned frequency at the predetermined time to receive the next portion of the image.

Figure 9:
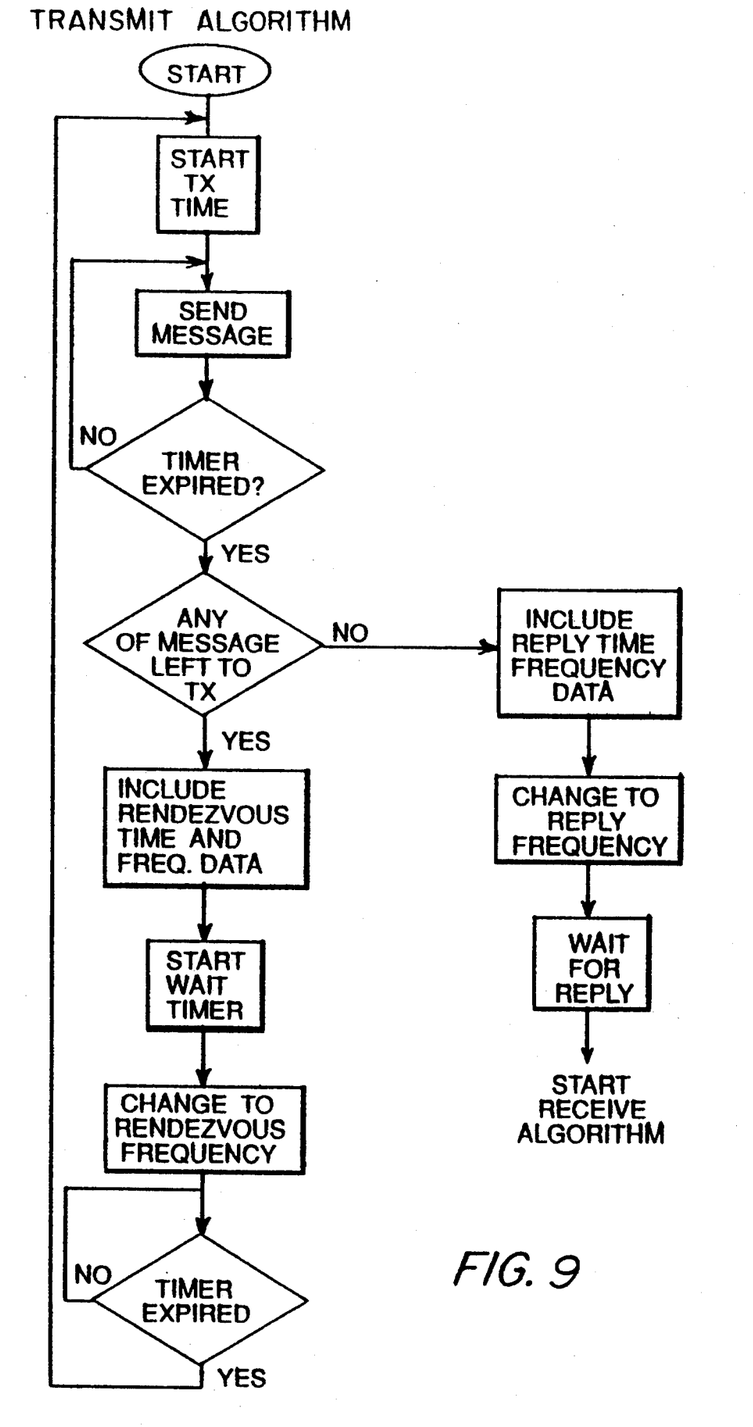
FIG. 9 is a flow diagram of a method of transmitting data which may be utilized by the system of FIG. 2.

With reference to FIG. 9, a transmitting unit in the system of the present invention may utilize the method depicted in the flow diagram of FIG. 9. When the transmitting unit determines to transmit a message, the message is generally divided into multiple blocks of data. The first block of data is transmitted to the receiving unit on a previously specified frequency. If more blocks are to be sent, the transmission unit also sends a rendezvous time and frequency to the receiving units. While waiting for the determined rendezvous time, the transmitting unit may change to the rendezvous frequency so that it is prepared to transmit immediately upon the arrival of the rendezvous time. The transmission of messages at different rendezvous times and frequencies is continued until all of the message is sent, at which time the transmitting unit, in place of the rendezvous time and frequency, includes a reply time and frequency in its message to the receiving unit. Upon transmitting the reply time and frequency data, the transmitting units returns to the reply frequency and waits for the reply, which will identify bad blocks which are to be resent, if any. If a reply is received, the transmitting unit becomes the receiving unit and may use the receiving method illustrated in FIG. 10, below.

Figure 10:
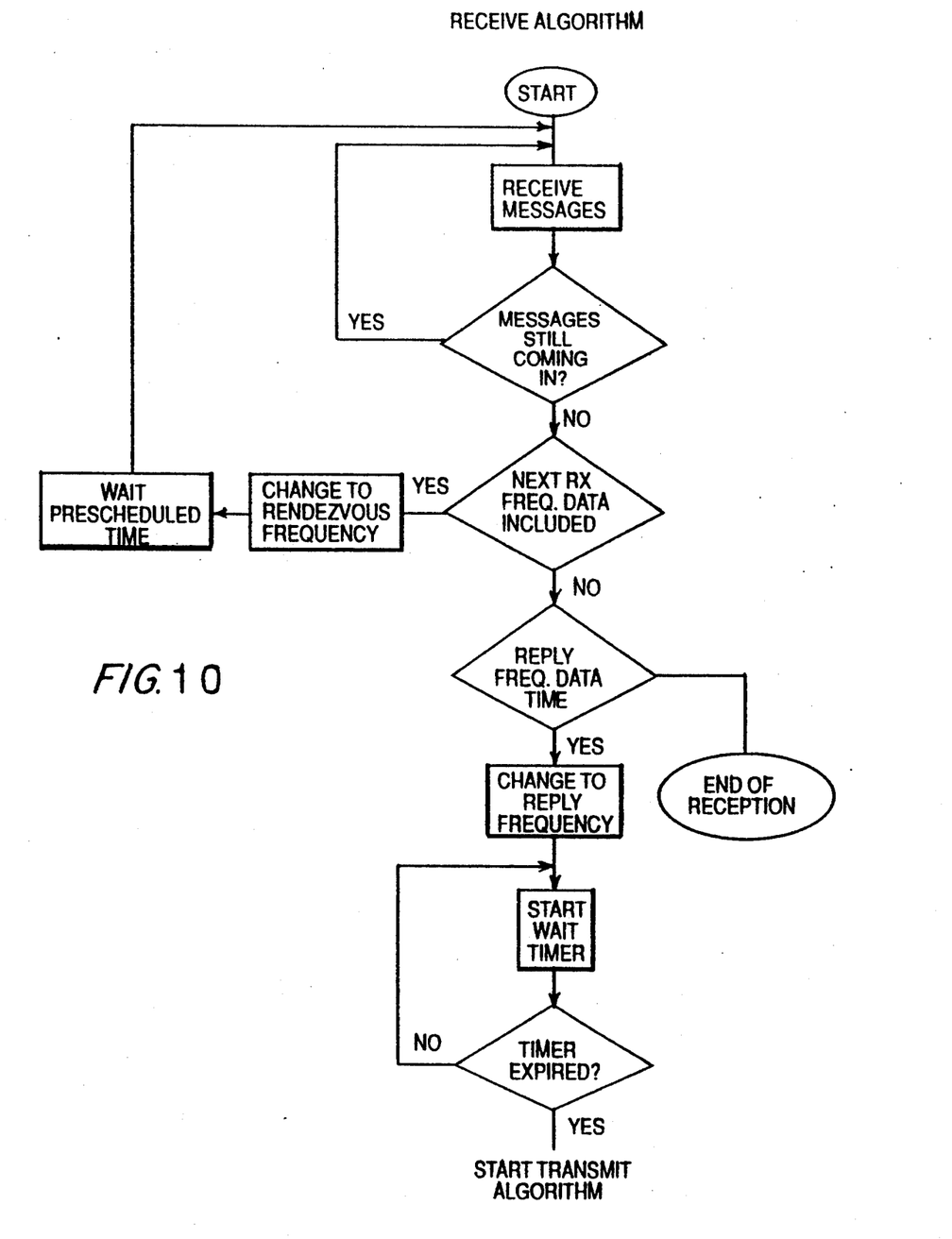
FIG. 10 is a flow diagram of a method of receiving data which may be utilized by the system of FIG. 2.

With reference to FIG. 10, the receiving unit upon reception of a portion of a message captures the portion of the message until the end of the message. Upon receiving the message portion, the message portion is checked to determine whether a rendezvous frequency and time have been included. If a rendezvous frequency and time have been included, the receiving units retunes its radio to the rendezvous frequency, and waits the amount of time until the rendezvous is scheduled at which point it again receives data on the rendezvous frequency. At the completion of the message, the transmitting unit will have sent a reply frequency and rendezvous time to which the receiving unit may retune and, upon the expiration of the specified time, transmit to the transmitting unit the identification of bad blocks or packets that are to be resent.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

We claim:

1. Method for transmitting one or more portions of a digital image comprising the steps of:
    (a) separating said digital image into blocks of digital data representing the image;
    (b) selecting one or more groups of said blocks to be transmitted;
    (c) selectively reducing the amount of digital data in said blocks to be transmitted;
    (d) selecting the first said block of digital data to be transmitted in each of said groups; and
    (e) transmitting said first block first in each of said groups and the remaining of said blocks in each of said groups in order of proximity to said first block.

2. The method as defined in claim 1 wherein said step of transmitting further comprises the step of transmitting on a narrow band communications channel.

3. Method for transmitting an image represented by digital data comprising the steps of:
    (a) defining blocks to be transmitted, each of said blocks comprising digital data in packets representing a portion of said image;
    (b) designating a first of said blocks to be transmitted and the order of transmission of the other said blocks based on proximity to said first block independently of step (a);
    (c) selectively adjusting the amount of digital data in each of said blocks; and
    (d) transmitting said blocks responsive to steps (b) and (c).

4. The method as define in claim 3 further comprising the steps of indicating said blocks to be transmitted on a monitor and indicating completion of transmission of said blocks on said monitor.

5. The method as defined in claim 3 further comprising the steps of:
   (a) providing first check sums for said packets of digital data to be transmitted;
   (b) transmitting said packets with corresponding said first check sums;
   (c) receiving said packets with said first check sums;
   (d) calculating second check sums for received said packets;
   (e) comparing corresponding said first and second check sums;
   (f) identifying said packets in which said first and second check sums are not the same;
   (g) retransmitting only identified ones of said packets after said blocks have been transmitted.

6. A method for selectively transmitting one or more portions of a high resolution image depicted by digital data comprising the steps of:
   (a) establishing a matrix on said image of blocks containing digital data;
   (b) selecting one or more interest centers on said image, wherein each said interest center is one of said blocks representing a focal point of a portion of said image to be transmitted;
   (c) selecting a group of said blocks proximate to and including one said interest center, wherein each said group represents a portion of said image to be transmitted;
   (d) selectively reducing the amount of digital data in each of said blocks to be transmitted;
   (e) selectively assigning an order of transmission for each said group; and
   (f) transmitting each said group, wherein said interest center is transmitted first in each said transmitted group and the remaining said blocks in each said transmitted group are transmitted in order of proximity to said interest center.

7. The method as defined in claim 6 wherein said step of transmitting further comprises the step of transmitting on a narrowband communication channel.

8. A method of transmitting and receiving digital data representing an image comprising the steps of:
   (a) defining blocks of said data representing portions of said image;
   (b) loading digital data from the defined blocks into packets of data to be transmitted;
   (c) providing first check sums for said packets of data;
   (d) transmitting said packets of data and said first check sums;
   (e) receiving said packets of data and said check sums without acknowledging receipt until after said blocks are received;
   (f) calculating second check sums for received said packets of data;
   (g) comparing corresponding said first and second check sums;
   (h) identifying said blocks of data in which corresponding said first and second check sums are the same for each of said packets therein;
   (i) identifying said packets of data in which said first and second check sums are not the same;
   (j) retransmitting said packets of data identified in step (i).

9. The method as defined in claim 8 further comprising the step of reloading digital data from each of said packets identified in step (i) into plural packets for retransmission.

10. The method as defined in claim 9 further comprising the step of retransmitting the reloaded plural packets plural times wherein the number of retransmissions is related to an operator-selected transmission condition.

11. A method of transmitting and receiving a portion of a digital image comprising the steps of:
   (a) separating said digital image into blocks of digital data representing the image;
   (b) selecting a group of said blocks representing the portion of the image to be transmitted;
   (c) selectively compressing the digital data in said group whereby the amount of digital data to be transmitted may be reduced;
   (d) loading the compressed digital data into packets;
   (e) transmitting said packets from a transmitting unit.
   (f) receiving said packets at a receiving unit;
   (g) determining at the receiving unit whether each received packet is correct;
   (h) transmitting a message from the receiving unit indicating that all of the packets in one of said blocks were correctly received, when all of the packets in the one of said blocks were correctly received;
   (i) transmitting a message from the receiving unit indicating that a specified one of the received packets is incorrect, when the specified one of the received packets is incorrect;
   (j) selectively retransmitting in plural packets from the transmitting unit the digital data in the received packet indicated to be incorrect.

12. A method of transmitting blocks of digital data representing a portion of a digital image comprising the steps of:
   (a) loading said digital data from said blocks to be transmitted into packets;
   (b) transmitting said packets from a transmitting unit;
   (c) receiving said packets at a receiving unit;
   (d) identifying the blocks having each of the packets therein correctly received;
   (e) identifying the packets that were incorrectly received; and
   (f) retransmitting the packets that were incorrectly received.

13. A system for transmitting a portion of an image represented by digital data comprising:
   (a) means for separating said image into blocks of digital data;
   (b) means for selecting for transmission one or more groups of said blocks;
   (c) means for selectively reducing the amount of digital data in each of said blocks;
   (d) means for designating one said block to be transmitted first in each of said groups; and
   (e) means for transmitting said designated block first and the remainder of said blocks in order of proximity to said designated block.

14. The system as defined in claim 13 wherein said means for transmitting comprises means for transmitting on a narrow band communications channel.

15. A system for transmitting an image represented by digital data comprising:
   (a) means defining blocks to be transmitted, each of said blocks comprising digital data in packets representing a portion of said image;
   (b) means for selectively designating a first of said blocks to be transmitted;

(c) means for designating the order of transmission of the other said blocks based on proximity to said first block;

(d) means for selectively adjusting the amount of digital data in each of said blocks; and (e) means for transmitting said blocks.

16. The system as defined in claim 15 further comprising means for selectively adjusting the compression of each of said blocks before transmitting said blocks.

17. The system as defined in claim 15 further comprising a monitor means for indicating said blocks to be transmitted on said monitor, and means for indicating completion of transmission of said blocks on said monitor.

18. The system as defined in claim 15 further comprising:

(a) means for providing first check sums for said packets of digital data to be transmitted;

(b) means for transmitting said packets with corresponding said first check sums;

(c) means for receiving said packets and said check sums;

(d) means for calculating second check sums for received said packets;

(e) means for comparing corresponding said first and second check sums;

(f) means for identifying said packets in which said first and second check sums are not the same; and (g) means for retransmitting only identified ones of said packets after said blocks have been transmitted.

19. The system as defined in claim 15 wherein said means for transmitting comprises means for transmitting on a narrow band communication channel.

20. A system for selectively transmitting one or more portions of a high resolution image depicted by digital data comprising:

(a) means for establishing said image a matrix of blocks containing digital data;

(b) means for selecting one or more interest centers on said image, wherein each said interest center comprises one of said blocks representing a focal point of a portion of said image to be transmitted;

(c) means for selecting a group of said blocks proximate to and including one said interest center, wherein each said group represents a portion of said image to be transmitted;

(d) means for selectively reducing the amount of digital data in each of said blocks to be transmitted;

(e) means for selectively assigning an order of transmission for each said group; and (f) means for transmitting each said group, wherein said interest center is transmitted first in each said transmitted group and the remaining said blocks in each said transmitted group are transmitted in order of proximity to said interest center.

21. A system of transmitting and receiving digital data representing an image comprising:

(a) means for defining blocks of said data representing portions of said image;

(b) means for loading digital data from the defined blocks into packets of data to be transmitted;

(c) means for providing first check sums for said packets of data;

(d) means for transmitting said packets of data and said first check sums;

(e) means for receiving said packets of data and said check sums without acknowledging receipt until after each of said blocks is received;

(f) means for calculating second check sums for received said packets of data;

(g) means for comparing corresponding said first and second check sums;

(h) first means for identifying said blocks of data in which corresponding said first and second check sums are the same for each of said packet therein;

(i) second means for identifying said packets of data in which said first and second check sums are not the same; and (j) means for retransmitting said packets of data identified by second said means for identifying.

22. A method of selectively transmitting one or more portions of a high resolution image depicted by digital data and displayed on a monitor, comprising the steps of:

(a) establishing a matrix on said image of blocks containing digital data;

(b) selecting one or more interestcenters on said image, wherein each said interestcenter is one of said blocks representing a focal point of a portion of said image to be transmitted;

(c) selecting a group of said blocks proximate to and including one said interestcenter, where in each said group represents a portion of said image to be transmitted;

(d) selectively reducing the amount of digital data in each of said block to be transmitted;

(e) selectively assigning an order of transmission for each said group;

(f) transmitting each said group, wherein said interestcenter is transmitted first in each said transmitted group and the remaining set blocks in each said transmitted group are transmitted in order of proximity to said intercenter;

(g) indicating on said monitor the transmission of each of said blocks in said groups after transmission of each of said blocks, wherein said groups are transmitted in parts having random lengths at random intervals and on random frequencies; and (h) instructing a receiver to receive said parts at corresponding said intervals and said frequencies.

* * * * *